Aug. 6, 1940.    F. JOHNSKE ET AL    2,210,410
COMPENSATOR FOR RADIO DIRECTION FINDERS
Filed Sept. 3, 1937
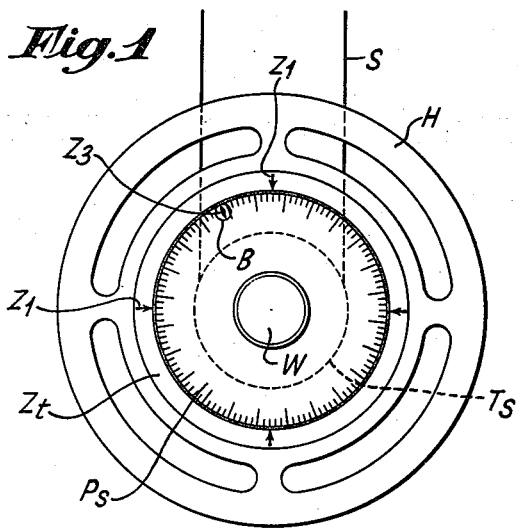
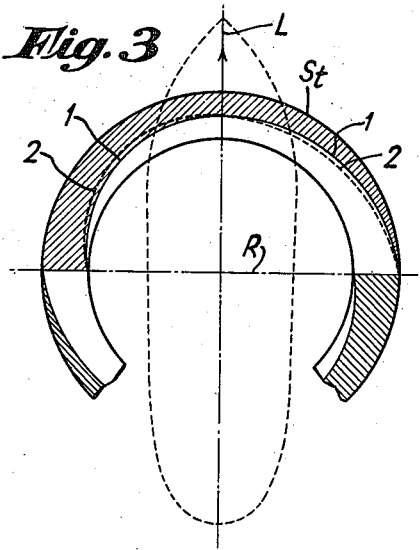
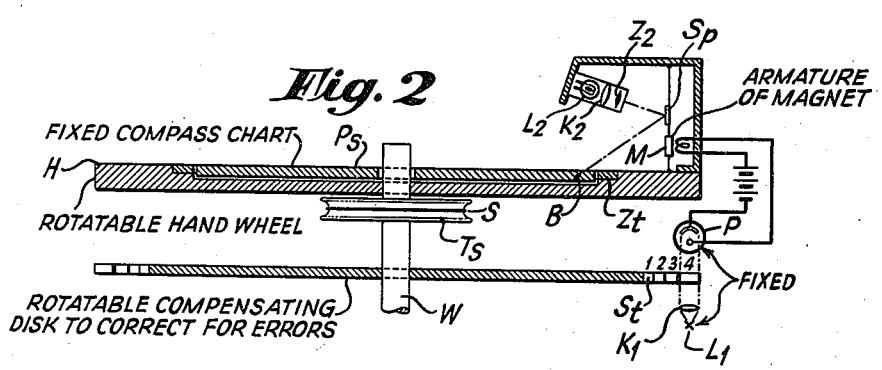
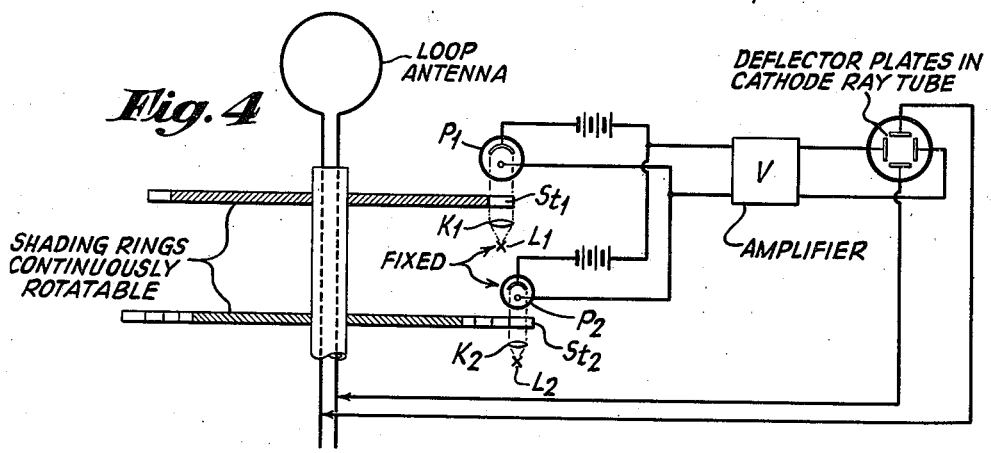
INVENTORS
FRITZ JOHNSKE AND
RUDOLF ROMEIKE
BY
ATTORNEY.

Patented Aug. 6, 1940

2,210,410

UNITED STATES PATENT OFFICE 2,210,410

COMPENSATOR FOR RADIO DIRECTION FINDERS

Fritz Johnske and Rudolf Romeike, Berlin, Germany, assignors to Telefunken Gesellschaft für Drahtlose Telegraphie m. b. H., Berlin, Germany, a corporation of Germany Application September 3, 1937, Serial No. 162,261 In Germany July 24, 1936

9 Claims. (Cl. 250—11)

As a general rule, such compensators as are known in the art use mechanical gears or intermediary means which serve to control the rotation of a scale or dial or of an indicator hand or pointer as a definite function of the angular position of the direction-finding device.

Arrangements of this kind are not entirely satisfactory, since they are not readily adaptable to variations in direction-finding conditions such as caused by varying draft of vessels, or by other factors of error which vary with the use of different wave-lengths. Mechanical gears or cams are not made conveniently interchangeable, but their adjustments usually entail loss of time. Another consideration is that these methods are unsuited for direct indication and reading.

Our invention will now be described by reference to the accompanying drawing in which Fig. 1 shows certain details of a conventional control wheel and associated apparatus of a direction finder. Like parts in this and the other figures have similar reference characters in order that the novel features of the invention as shown in the other figures may appear in their proper setting.

Fig. 2 shows a direction-finder dial in section and in association with our novel compensator.

Fig. 3 shows a disk for controlling the intensity of a light beam used as a correction factor.

Fig. 4 shows a circuit diagram of a preferred embodiment.

Our invention provides electro-optical means whereby an arbitrary correction of the direction-finder readings is automatically applied without the aid of mechanical gears. In fact, by the simple throw of circuit adjusting device indications may be changed so as to be adapted to various conditions of direction-finding as well as to the simultaneous reading of the uncorrected bearings together with the corrected data. The method here disclosed is useful both for direction-finding devices heretofore commonly used as well as those designed to produce a direct optical indication. It has this outstanding feature that in indirect or direct dependence upon the correction to be introduced in the bearing data, an electrical quantity is produced which, in turn, will automatically correct the readings.

In carrying out our invention, use is made of a rotating device which is made effective to introduce into the direction finding circuits a definite electrical quantity the value of which serves as a correction factor for each given position of the direction-finder. We have a considerable choice of means for varying the electrical constants of the circuits. For example, we may use variable ohmic resistances. On the other hand, we might use capacitive or inductive reactances which consist of two co-acting members, one of which is caused to revolve with the direction-finder, while the other one is stationary, with the result that a definite impedance value results for each and every position of the direction-finder. However, the preferable way is to employ light valve devices (stops or diaphragms) which allow the quantity of light impinging upon a photo-electric cell to be varied as a function of the angular position of the revolving direction-finder device. The output potential of the photo-electric cell or the amplifier associated therewith is then used for acting upon the readings.

So far as the action brought upon the readings by the ensuing electrical quantity is concerned, one explanation of the exemplified arrangement will be sufficient. Such a system may be used for aural reading of the direction-finding data or for direct visual reading of these data. We preferably employ a light source which is arranged to revolve with the direction finding handwheel. Alternatively the light source may be made stationary and a beam of light therefrom can be rotated by means of a mirror or prism associated with the handwheel. On the dial a luminous spot appears, or else a shadowgraph indication is made, as when the beam is intercepted by a pointer. The "electrical quantity" causes deflection of the mirror and thus a shift in the luminous mark upon the direction-finder dial or scale. Inasmuch as the entire mirror assembly rotates conjointly with the direction-finder wheel, the shift of the luminous mark can be made proportional to the corrective quantity to be automatically added to the uncorrected direction finding indication. The latter may additionally be read, as heretofore, by an indicator mark upon the direction-finding wheel.

However, the arrangement as hereinbefore disclosed may be altered also to insure purely mechanical operation in such a way that the deflection of the said deflection mirror is not produced by an electrically actuated deflector system, but is rather affected mechanically by the agency of a hand lever or feeler device. The latter, in turn, may be operated by the aid of a guide device rotatable with the direction-finder outfit, with the result that the said hand lever is moved out of its normal position in accordance with the values of correction of direction-finder readings or bearing data. The guide means required therefor, such as cams, may be made substantially simpler for such an arrangement than where the lead or lag of the pointer, for a corrected reading, is effected without the luminous mark or shadowgraph system by purely mechanical means.

In conjunction with direct-reading direction-finder outfits which use a constantly rotating direction-finder in combination with an oscillographic system, the "electrical quantity" is suitably brought to act directly upon the indicator light pencil or cathode-ray pencil or spot. Thus, the position of the spot over the time axis which represents the direction-finding scale, is a function, on the one hand, of the particular angular position of the revolving direction-finder, and, on the other hand, is additionally dependent upon the electrical quantity causative of the correction.

In the use of light valve means for the generation of the electrical quantity, the scanning pencil or spot may be changed over to different control profiles in a plurality of light valve paths. Each such profile, as will be understood, is co-ordinated to a definite condition of direction-finding, for instance, to the draft of a vessel or a definite wave-length.

Further features of the present invention will now be described in greater detail, reference being made to the drawing.

The conventional hand wheel H is adapted to orient the direction finding loop or frame. Driving connection thereto may be made through a cable or cord S. A supporting ring $Z_t$ is shown in association with the hand wheel H. The compass chart $P_s$ is fixedly oriented in respect to the longitudinal axis of the vessel, whereas the reference marks or pointers $Z_i$ are carried on the ring $Z_t$ adjacent the scale.

Fig. 2 is a sectional view of the direction-finder dial $P_s$ and the indicator mark support $Z_t$. Seated upon the supporting ring $Z_t$ is a luminous spot indicator comprising light-source $L_2$, and a condensing lens $K_2$ designed to produce a parallel pencil of rays to be intercepted by the stationary indicator or reading mark $Z_2$. The deflector mirror $S_p$ is made adjustable to lateral deflections by the drive mechanism M. The shadow of the reading mark $Z_2$ is imaged upon the direction-finding dial $P_s$ at point B. On the other hand, the rotatable indicator support $Z_t$ turns with a light control disk $S_t$ which consists of several concentric light-intercepting rings indicated at 1, 2, 3, 4, having dissimilar shapes. They regulate the quantity of light falling upon the stationary photo-electric cell P from the stationary source of light $L_1$ through the stationary condenser lens $K_1$ in accordance with such corrections as are required, such as the correction of the bearing data. The peripheries of the rings may be profiled either internally or externally so as to act as light valves for intercepting different cross-sectional areas of a beam of light emitted by the source $L_1$ and focussed by the lens $K_1$ in a direction toward the photo-electric cell P. The profile of each of the rings 1, 2, 3 and 4 is determined by a correction factor which compensates for local electromagnetic influences tending to produce deviations of directional indication from the true indication. The different rings 1, 2, 3 and 4 may be employed selectively in accordance with variations in the draft of the vessel or any other variables of the deviational error factor. Means (not shown) are provided for shifting the position of the optical system including the elements $L_1$, $K_1$ and P toward or away from the rotational axis so that different rings will be effective as light valves for intercepting the light beam.

It is apparent from the above description that a correction factor may be applied to the aiming of a beam of light from the source $L_2$ by the mirror $S_p$ upon the index scale $P_s$ at the point B. The mirror deflecting means may be in the form of an armature M on which the mirror $S_p$ is mounted. The armature M is controlled electromagnetically by a coil in circuit with the photo-electric cell P or, if desired, the output potential of the photo-electric cell may first be amplified and then fed to the electromagnetic drive system for deflecting the armature M and mirror $S_p$.

In the operation of the system according to Fig. 2 relative motion may be obtained between the optical system and the light valve rings in either of two ways. The optical system may be made rotatable in conjunction with the hand wheel H which is mounted on the axle W, while the light valve rings 1, 2, 3 and 4 are mounted in fixed relation to the axis of reference, say, the longitudinal axis of the ship. As an alternative arrangement the light valve rings 1, 2, 3 and 4 may be mounted on a disc which is fixed with respect to the axle W and, therefore, rotatable therewith, while the optical system, including the members $L_1$, $K_1$ and P, is made stationary. In this case, of course, connections to the rotatable electromagnetic unit for controlling the deflection of the mirror $S_p$ through the armature M would need to be made through a slip ring device.

Figs. 1 and 2 show further the operation of these arrangements. It is here assumed that in the presence of bearing correction $f=0$ the image of the luminous indicator mark or spot $Z_3$ becomes visible opposite the usual mark $Z_1$, in other words, that it is the same reading as the uncorrected direction-finder result. If $f$ has a value other than 0, as a result of the deflection of the mirror $S_p$ (Fig. 2) by action of the drive mechanism M, the image of the spot $Z_3$ will lead or lag behind the indicator mark $Z_1$ so that in any particular case $Z_1$ would indicate the uncorrected and $Z_3$ the corrected bearing. If the direction-finding readings are to be changed over to adapt them to another wave-length or to another draft, then the optical system $L_1$ $K_1$ P must be shifted so as to be controlled by a different one of the light valve rings 1, 2, 3 or 4.

Fig. 3: This shows a light-control disk $S_t$ which constantly revolves together with the direction-finder. Referring to this figure, R is the projection of the frame upon the plane of the drawing, L the longitudinal axis of a vessel. The fundamental idea of this arrangement is that the quantity of light reaching the photo-electric cell through the control disk causes the deflection of the indicator pencil or spot of an oscillograph over the time axis serving as a direction-finding index. The boundary line 1 of the light-valve part of the said control disk determines the amount of correction to be applied to the deflection of the oscillograph pencil as it appears on the direction-finding scale, which in this case is the fluorescent screen. The correction is repeated for each half rotation of the direction-finder. In order to automatically introduce the correction, all that is necessary is to so alter the profile of the light-control paths that the boundary line or contour 2 is used instead of 1. Thus, for the same position of the direction-finder there results a shift in the position of the pencil over the direction-finding dial, and this may be proportioned to the desired correction. If one semi-circle of the light-control path has a profile 1, and if that of the other one is 2, then alternately the corrected and the uncorrect bearing will be so represented that both may appear as standing luminous curves. In order to be able to distinguish them from each other, the brightness of one of the semi-circles may be dimmed during the scanning.

Fig. 4 illustrates a system where an expeditious change from one direction-finding state or condition to another condition can be made. The device is applicable either to directly indicating direction-finder systems or to oscillograph indicators. In this instance, a distinct light-control outfit with separate control disk is preferably employed, and this disk, in turn, may contain different light-control paths. Time-base deflection of an oscillograph, say, a co-ordinate type inker or recorder or a cathode ray tube is insured by a light-control disk $St_1$ driven by the rotating shaft, and causing the photo-electric cell $P_1$ and amplifier V to variably actuate one of the deflecting circuits of the oscillograph. Now, if desired, a second control disk $St_2$ comprising light-control paths 1, 2, 3, 4 may at the same time be scanned by a distinct scanning assembly $L_2$ $K_2$, and $P_2$, and the ensuing output potential of the system may be utilized for an additional control of time-base deflection in accordance with and in proportion to the corrective values of radio direction-finding data.

It will be understood that this invention is by no means confined to direction-finding equipments comprising a direction-finder frame or loop. Other applications of the invention will readily suggest themselves to those skilled in the art. Other embodiments and details of construction will also suggest themselves in view of the foregoing description. For example, modifications may be made in the light-control means, as well as in the shape of light-control disks. Furthermore, we do not wish to be limited to the particular embodiments shown, since other forms of cylinders having slits, or drums or barrels may be used, having prepared or pre-shaped matrices for applying the proper correction factor at each direction of orientation of the direction finder.

We claim:

1. In a direction finder, a directional antenna, means for orienting said antenna into a position for obtaining a directional indication, scale and pointer elements one of which is rotatable with the antenna, and the other of which is fixed with respect to the longitudinal axis of a vessel, and an error correcting device comprising an electrical energy source and electro-optical means operable conjointly with the scale and pointer elements for controlling the amount of energy from said source to be applied as a correction factor to said directional indication as derived from observance of the amplitude of an incoming signal collected by said antenna in relation to the orientation thereof, the last said means having a predetermined characteristic which varies as a function of the direction of orientation of said antenna with respect to the orientation of the axis of said vessel.

2. A system according to claim 1 and having the last said means constituted by a light source, a light-valve arrangement for variably intercepting light from said source as a function of the rotation of said antenna, and photo-electric means for translating variable effects of said light valve into an electrical quantity.

3. An error correcting device comprising a source of light, an optical system adapted to project a beam from said source, means orientable under control of a direction finder for variably intercepting said beam, thereby to control the light value of said beam, said means having a characteristic effectiveness which is a function of its orientation, photo-electric means responsive to variations in the intensity of said controlled beam for producing an electrical influence constituting a directional correction factor, and a source of directional signals with which said electrical influence may be coordinated.

4. In a direction finder of the type having a continuously rotatable directional antenna, a cathode ray tube oscilloscope comprising beam deflecting circuits one at least of which is under control of directional signals collected by said antenna, and electro-optical correction means including a device operable in different positions of orientation of said antenna for impressing on another of said deflecting circuits electrical potentials of predetermined error-compensating values.

5. A device in accordance with claim 4 in which said correction means comprises a photo-cell and a light beam source impinging thereon, and means for regulating the light value of said beam in dependence upon the direction of orientation of said antenna with respect to a directional line of reference.

6. A device in accordance with claim 4 in which said correction means comprises a light valve having a predetermined profile characteristic, whereby variations are produced in the factor of correction to be applied to said deflecting circuits.

7. In a direction finder, a rotatable antenna, an indicating device responsive to signals collected by said antenna, an error correcting device having a predetermined characteristic control means for evaluating a beam of light in accordance with the orientation of said antenna and further in accordance with a correction factor to be applied to said signals, and means for translating the varying intensities of said light beam into electrical variations constituting said correction factor, whereby the indications made by said indicating device are calibrated.

8. The method of compensating for aberrations from the true directional indications of a radio direction finder having a rotatable directional antenna and indicating means responsive to signals collected by said antenna, which comprises producing a light effect which is a function of the angle of orientation of said antenna with respect to a direction of reference, translating said light effect into an electrical effect, and controlling the response of said indicator to said signals in accordance with the value of said electrical effect.

9. In a direction finder of the type having a rotatable directional antenna and means connected thereto for observing the amplitude of a signal response when the antenna is turned in different directions, an optical system operable in association with an index scale for producing an indication of angular relationship between the directional axis of said antenna and an axis of reference, an error compensating device having two mounting units, one fixed in relation to said axis of reference and the other fixed in relation to the directional axis of said antenna, one of said units having mounted thereon means for emitting a light beam and a photo-electric device for translating light intensity into an electrical quantity, the other of said units having a light valve suitably mounted thereon for intercepting said light beam, and means operable in response to variations in said electrical quantity due to a function of the relationship between the settings of said two units for introducing a correction factor into the indication produced by said optical system.

FRITZ JOHNSKE.
RUDOLF ROMEIKE.